US011905982B2

(12) United States Patent
Barbolini et al.

(10) Patent No.: US 11,905,982 B2
(45) Date of Patent: Feb. 20, 2024

(54) COOLANT EQUALIZING RESERVOIR WITH INTEGRATED VORTEX CHAMBER SPACED AWAY FROM THE RESERVOIR WALL ALONG ITS ENTIRE CIRCUMFERENCE

(71) Applicant: Röchling Automotive SE, Mannheim (DE)

(72) Inventors: Marco Barbolini, Bolzano (IT); Zaoli He, Suzhou (CN)

(73) Assignee: Röchling Automotive SE, Mannheim (DE)

( * ) Notice: Subject to any disclaimer, the term of this patent is extended or adjusted under 35 U.S.C. 154(b) by 0 days.

(21) Appl. No.: 17/720,461

(22) Filed: Apr. 14, 2022

(65) Prior Publication Data

US 2022/0333623 A1    Oct. 20, 2022

(30) Foreign Application Priority Data

Apr. 20, 2021  (DE) ..................... 10 2021 110 014.3

(51) Int. Cl.
*F15D 1/00*        (2006.01)
*B60H 1/00*       (2006.01)

(52) U.S. Cl.
CPC ....... *F15D 1/0015* (2013.01); *B60H 1/00571* (2013.01)

(58) Field of Classification Search
CPC .............. F15D 1/0015; B60H 1/00571; B01D 19/0057; B01D 19/00; B60K 11/02; F01P 11/028; F01P 11/029; F01P 2050/24
See application file for complete search history.

(56) References Cited

U.S. PATENT DOCUMENTS

| 2,556,319 | A | * | 6/1951 | Davis ...................... F01D 25/20 96/180 |
| 4,860,591 | A | * | 8/1989 | Garland ............. B01D 19/0057 73/861.04 |
| 8,251,024 | B2 | | 8/2012 | Hutchins |
| 2012/0261012 | A1 | * | 10/2012 | Andoh .................. F15D 1/0015 137/613 |

(Continued)

FOREIGN PATENT DOCUMENTS

DE            10050852 A1    5/2002

OTHER PUBLICATIONS

German Search Report for corresponding DE 10 2021 110 014.3 dated Nov. 30, 2021, 7 pgs.

(Continued)

*Primary Examiner* — Patrick C Williams
(74) *Attorney, Agent, or Firm* — Rankin, Hill & Clark LLP

(57) ABSTRACT

A coolant equalizing reservoir for arrangement in a coolant circuit, having:
  a reservoir housing,
  a vortex chamber in the reservoir housing,
  a feed line for introducing coolant into the reservoir housing, and
  an outflow aperture for discharging coolant from the reservoir housing,
where the feed line discharges into the vortex chamber, and wherein the vortex chamber is defined by a wall protruding from a base-wall section of the reservoir housing along a vortex chamber's axis, encircling the vortex chamber's axis in a closed manner, which in every direction orthogonal to the vortex chamber's axis is arranged at a distance from the reservoir housing.

12 Claims, 3 Drawing Sheets

(56) References Cited

U.S. PATENT DOCUMENTS

2016/0208678 A1    7/2016  Zhang et al.
2018/0283261 A1*  10/2018  Morishita .............. F01P 11/029
2019/0091607 A1*   3/2019  Kirk .................... B03D 1/1462

OTHER PUBLICATIONS

Espacenet Bibliographic data:DE 10050852 (A1), Published May 2, 2002, 1pg.

* cited by examiner

COOLANT EQUALIZING RESERVOIR WITH INTEGRATED VORTEX CHAMBER SPACED AWAY FROM THE RESERVOIR WALL ALONG ITS ENTIRE CIRCUMFERENCE

This application claims priority in German Patent Application DE 10 2021 110 014.3 filed on Apr. 20, 2021, which is incorporated by reference herein.

The present invention concerns a coolant equalizing reservoir for arrangement in a coolant circuit, in particular in a motor vehicle, comprising:
A reservoir housing,
A vortex chamber in the reservoir housing,
A feed line for introducing coolant into the reservoir housing, and
An outflow aperture discharging coolant from the reservoir housing,
Where the feed line discharges into the vortex chamber.

BACKGROUND OF THE INVENTION

Such a coolant equalizing reservoir, hereunder also referred to briefly only as "equalizing reservoir", is known from DE 100 50 852 A1. Like the equalizing reservoir of the present invention, this known equalizing reservoir is also suitable and intended for arrangement in coolant circuit of a motor vehicle, hereunder referred to in brief as "cooling circuit".

Such equalizing reservoirs in the cooling circuit usually fulfil two tasks: For one thing, they provide an equalizing volume, in order to take up a volume increase of the coolant circulating in the cooling circuit caused by a temperature increase. For another, mostly via vortex chambers, equalizing reservoirs ensure degassing of the coolant which is advantageous for preventing undesirable cavitation at conveying devices used for conveying the coolant in the cooling circuit, such as for instance at pump wheels and valves.

Known cooling circuits with equalizing reservoirs for motor vehicles with internal combustion engines are operated at a volume flow of approximately 5 l/min. Surprisingly, battery-run electric vehicles require quantitatively higher coolant flows of 10 or even 12 l/min or more to cool their heating-up vehicle components. With an increasing volume flow of the coolant, its degassing becomes more difficult, which presumably at a given accommodating volume of the equalizing reservoir is associated with the shortening dwell time of the coolant in the equalizing reservoir.

Numerous further equalizing reservoirs are known from the state of the art. With a certain relevance for the present invention, one may additionally refer to the equalizing reservoir of DE 10 2008 060 088 B4.

In order to realize savings potentials in materials and production costs, in both known equalizing reservoirs with a vortex chamber integrated into the equalizing reservoir, a part of the vortex chamber wall which bounds radially outside the turbulent flow which arises in the vortex chamber is at the same time also part of the reservoir wall. Subdividing a region inside the reservoir housing but outside the vortex chamber into several chambers separated from one another is known moreover from DE 100 50 852 A1, where the partitions separating the chambers from one another exhibit communicating apertures through which coolant can flow from one chamber into the neighboring chamber beyond the partition.

SUMMARY OF THE INVENTION

It is the task of the present invention to improve the equalizing reservoir mentioned at the beginning in such a way that even at higher volume flows of coolant above 10 or even above 12 l/min, it makes possible efficiently a thermally induced expansion of the coolant and its degassing without an increase in installation space.

This task is solved by the present invention in an equalizing reservoir as mentioned at the beginning, by having the vortex chamber defined by a wall protruding from a base-wall section of the reservoir housing along a vortex chamber's axis, encircling the vortex chamber's axis in a closed manner, which in every direction orthogonal to the vortex chamber's axis is arranged at a distance from the reservoir housing.

In principle, the vortex chamber into which the coolant is introduced can exhibit a nearly arbitrary shape. To achieve the least possible turbulent flow after introducing the coolant into the vortex chamber, the wall of the vortex chamber which encircles the vortex chamber's axis in a closed manner exhibits a kink-free concavely curved inner surface. Preferably the inner surface of the wall is free from flow obstacles, such as for example crosspieces protruding from the inner surface or deflector plates which protrude from the wall towards the vortex chamber's axis. The vortex chamber can exhibit a spherical or spherical cap-shaped inner surface. Preferably the vortex chamber exhibits a circular cylindrical or elliptical cylindrical inner surface. It is also not precluded that different inner surface shapes are combined in different regions of the wall of the vortex chamber, for example when a wall section with a dome-shaped inner surface joins a cylindrical inner wall surface in the region of a cylindrical end-face.

The vortex chamber of the equalizing reservoir of the present invention can also exhibit a wall section configured together with the reservoir housing wall, for instance at the base-wall section in order to form an inner wall surface bounding the vortex chamber, oriented transversely to the vortex chamber's axis. If only one vortex chamber axis exists, the vortex chamber can exhibit a cylindrical, conical, or generally a chamber shape that tapers and/or widens section-wise along the vortex chamber's axis. The inner surface of the wall of the vortex chamber exhibits intersection lines which encircle the vortex chamber's axis in sectional planes orthogonal to the vortex chamber's axis. These are preferably circles, where however elliptical or oval intersection lines should also not be precluded.

Through the introduction of the coolant into the vortex chamber, the former can, as already known from the state of the art, flow along the inner wall surface of the vortex chamber, normally flowing in a vortex, and in doing so undergo degassing. Through the configuration of the vortex chamber wall at a distance orthogonally to the vortex chamber's axis on all sides from the reservoir housing, that is, from the reservoir wall, a flow path of the coolant in the equalizing reservoir but outside the vortex chamber can be configured to be long. The dwell time of the coolant in the equalizing reservoir can thereby be increased and thus the degassing result improved.

Through the aforementioned configuration of the vortex chamber at a distance from the reservoir housing, the vortex chamber can be accommodated in the reservoir housing with coolant able to flow completely around it on the outside in the circumferential direction. Due to the coolant being able, after leaving the vortex chamber, to flow around the vortex chamber on its outside but still inside the reservoir housing, and consequently in addition to the turbulent flow in the vortex chamber to produce an annular flow outside the vortex chamber, the dwell time of the coolant in the equalizing reservoir can be further increased and consequently despite the quantitatively greater volume flow, the coolant degassed over a longer time and thereby with greater success.

In principle, the base-wall section from which the wall bounding the vortex chamber protrudes, can be an arbitrary wall section of the reservoir housing, for example a side-wall of the reservoir or a section of the reservoir top or of the reservoir bottom. Preferably the base-wall section is a section of the reservoir bottom or of the reservoir top located opposite the reservoir bottom, such that in the finally assembled, operational state, the vortex chamber's axis proceeds essentially in parallel to the gravitational direction or at least in a cone with a half apex angle of 10° about a cone axis parallel to the gravitational direction which intersects the vortex chamber's axis. Then a coolant flow introduced into the vortex chamber can advantageously circulate in a turbulent flow at a side-wall of the vortex chamber about the vortex chamber's axis, where the gravitational force has essentially the same effect on the flowing coolant at every circumferential location along the turbulent flow. If the vortex chamber's axis is inclined too steeply relative to the gravitational direction, undesirable flow separation can occur at the then existing upper vertex of the turbulent flow about the vortex chamber's axis.

So that the coolant introduced into the vortex chamber can also reach the region located outside the vortex chamber but still inside the reservoir housing, the wall of the vortex chamber preferably exhibits at least one passage aperture which penetrates completely through the wall in the thickness direction. The passage aperture is preferably configured at a location which in the operational state of the equalizing reservoir is situated geodetically as low as possible, such that the coolant can be introduced into the vortex chamber at a location which is situated geodetically as high as possible, and consequently travels the longest possible path inside the vortex chamber before it reaches the passage aperture. Preferably the passage aperture is arranged in such a way that a section of it is bounded by the reservoir bottom.

The above notwithstanding, the outlet of the feed line can be located in the vortex chamber at the same height as at least one passage aperture. This is possible in particular at high volume flows of 12 l/min or more, for instance of more than 20 l/min or more than 30 l/min. Therefore the outlet of the feed line can also be situated at a geodetically low, in particular at the geodetically lowest location of the vortex chamber. Due to the high volume flow, the introduced coolant can then rise from the geodetically low outlet, thus extending its flow path and therefore its dwell time.

In principle, a single passage aperture in the wall of the vortex chamber can suffice. In order to ensure that large volume flows of coolant can also reliably get from the vortex chamber into the region between the vortex chamber and the reservoir housing, the wall of the vortex chamber can exhibit a plurality of passage apertures each of which penetrates completely through the wall in the thickness direction. At least two of the passage apertures can be arranged at different circumferential positions in the circumferential direction about the vortex chamber's axis. Additionally or alternatively, at least two of the passage apertures can be arranged at different positions in a direction along the vortex chamber's axis. Additionally or alternatively, at least two passage apertures can exhibit different shapes, for instance circular and elliptical or round and polygonal, and/or quantitatively different aperture cross-sectional areas.

For better guiding of a coolant flow into the vortex chamber, a flow baffle can be arranged inside the vortex chamber. In order to achieve a coolant flow which as far as possible follows the inner wall surface, that is, the inner surface of the wall of the vortex chamber, the flow baffle can proceed in parallel to the inner wall surface of the vortex chamber at a distance to this inner wall surface. Preferably the flow baffle extends only along a circumferential section, but not completely closed about the vortex chamber's axis. Thus if the vortex chamber is a cylindrical vortex chamber, the flow baffle is preferably a part-cylindrical flow baffle. Preferably the flow baffle projects from the same base-wall section along the vortex chamber's axis as the wall of the vortex chamber. Preferably the flow baffle is curved about the vortex chamber's axis or about an axis of curvature parallel to the vortex chamber's axis.

Likewise, the flow baffle preferably extends in the region of the flow inlet into the vortex chamber, that is, in an axial region approximately along the vortex chamber's axis shared with the outlet of the feed line. Since the flow baffle should preferably influence the course of the coolant flow in its inlet region into the vortex chamber, it suffices if the flow baffle extends only over part of the dimension of the vortex chamber which is axial in respect of the vortex chamber's axis. The flow baffle is preferably situated completely in an especially preferably injection-molded reservoir shell carrying it, as it is elucidated in greater detail further below.

In order to accelerate or decelerate the coolant in the vortex chamber, a gap spacing between the inner surface of the wall of the vortex chamber and a surface of the flow baffle facing towards it along the flow path of the coolant in the gap formed by the inner surface of the wall of the vortex chamber and the surface of the flow baffle facing towards it, approximately in the circumferential direction about the vortex chamber's axis and/or about an axis of curvature of the flow baffle parallel to the vortex chamber's axis, can become smaller and/or larger respectively.

In principle it can suffice if the vortex chamber extends only over part of the space provided inside the reservoir housing along the vortex chamber's axis. For the longest possible flow path inside the vortex chamber, however, it is advantageous if the vortex chamber extends from the base-wall section of the reservoir housing along the vortex chamber's axis up to the end-wall section of the reservoir housing opposite the base-wall section. The vortex chamber thus preferably extends from the reservoir bottom up to the opposite reservoir top. Likewise, the flow baffle, if present, is preferably configured only in the lower or only in the upper reservoir shell. For the aforementioned reasons, the flow baffle if present is preferably configured in that reservoir shell which also exhibits the outlet of the feed line into the vortex chamber.

The equalizing reservoir can advantageously be formed in an injection molding process and for example comprise an upper and a lower reservoir shell. Preferably the lower reservoir shell comprises the reservoir bottom and part of the side-walls of the reservoir and the upper reservoir shell comprises the reservoir top and part of the side-walls of the reservoir. In this preferred case, each reservoir shell comprises part of the vortex chamber, where preferably the respective part of the vortex chamber is configured integrally with the reservoir shell exhibiting it.

In principle, the region outside the vortex chamber but inside the reservoir housing can be free from flow obstacles. Preferably, however, the region inside the reservoir housing but outside the vortex chamber is subdivided into a plurality of chambers communicating with one another. Such chambers are referred to in the state of the art as expansion chambers, since they serve more strongly than the flow-conducting vortex chamber for accommodating the temperature-induced volume increase of the coolant. In principle, the chambers are separated from one another by partitions, where the region inside the reservoir housing but outside the vortex chamber should be so configured that flow is possible in the circumferential direction about the vortex chamber's axis outside the vortex chamber. The flow in the circumferential direction can, but does not have to, go completely around the vortex chamber in a closed manner. To this end, partitions which separate two neighboring chambers from one another can exhibit a communicating aperture through which coolant can flow from one of the chambers into the respective neighboring one.

All the partitions can each exhibit at least one communicating aperture, such that coolant in the annular flow can flow around the vortex chamber outside several times. Alternatively, at least one partition can be free from a communicating aperture, in particular in order to physically separate a feed-side inner region and/or the feed line from the outflow aperture. The partition free from communicating apertures preferably extends all the way across between the reservoir housing and the vortex chamber, in order to achieve complete physical discontinuity of the space surrounding the vortex chamber outside.

To promote the degassing of the coolant, the communicating apertures of at least two partitions can be arranged at different distances from the vortex chamber and/or be arranged at different positions in a direction along the vortex chamber's axis. A flow which is radial and/or axial relative to the vortex chamber's axis can thereby be superimposed on a coolant flow flowing macroscopically outside around the vortex chamber. The coolant flow can thus, for example in a spiral or helical shape, be brought closer from the vortex chamber to a wall, in particular side-wall, of the reservoir housing, or the coolant flow flowing outside the vortex chamber around it can, for example in a kind of superimposed pendulum movement, get closer section-wise to the vortex chamber and to a wall, in particular side-wall, of the reservoir housing. Additionally or alternatively to the different arrangement locations of the communicating apertures, these can, for example for deliberately changing the flow velocity, exhibit different shapes and/or quantitatively different aperture cross-sectional areas. This further supports the degassing.

Preferably the planar partitions—where for each planar partition it is the case that its thickness dimension is significantly shorter than its physical main extension directions which are orthogonal to one another and to the respective local thickness direction—extend with at least one of their physical main extension directions in parallel to the vortex chamber's axis. Although this does not imperatively have to be the case, the configuration of planar partitions is preferable.

In principle, it is conceivable that the partitions extend along the vortex chamber's axis only over part of the corresponding dimension of the vortex chamber. For careful degassing of the quantitatively large volume flows of coolant mentioned at the beginning, however, it is preferable if partitions which separate two neighboring chambers from one another extend from a reservoir bottom up to a reservoir top which is opposite to the reservoir bottom.

The partitions too, are preferably formed by injection molding integrally with the respective reservoir shells carrying them.

To achieve in the reservoir housing a coolant flow with the longest possible flow path, the outflow aperture is preferably configured outside the vortex chamber in the reservoir housing. Thus the coolant has to flow from the inside of the vortex chamber into the outside environment of the vortex chamber in the reservoir housing.

The present application further concerns a motor vehicle, in particular a hybrid-electrically or fully electrically propelled motor vehicle, comprising a cooling circuit with a coolant equalizing reservoir configured according to the aforesaid description. The cooling circuit comprises a pump arrangement for producing a coolant flow in the cooling circuit, where the pump arrangement is configured to produce during proper normal cooling operation a volume flow of coolant of at least 12 l/min, preferably of at least 25 l/min, more preferably of at least 35 l/min.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
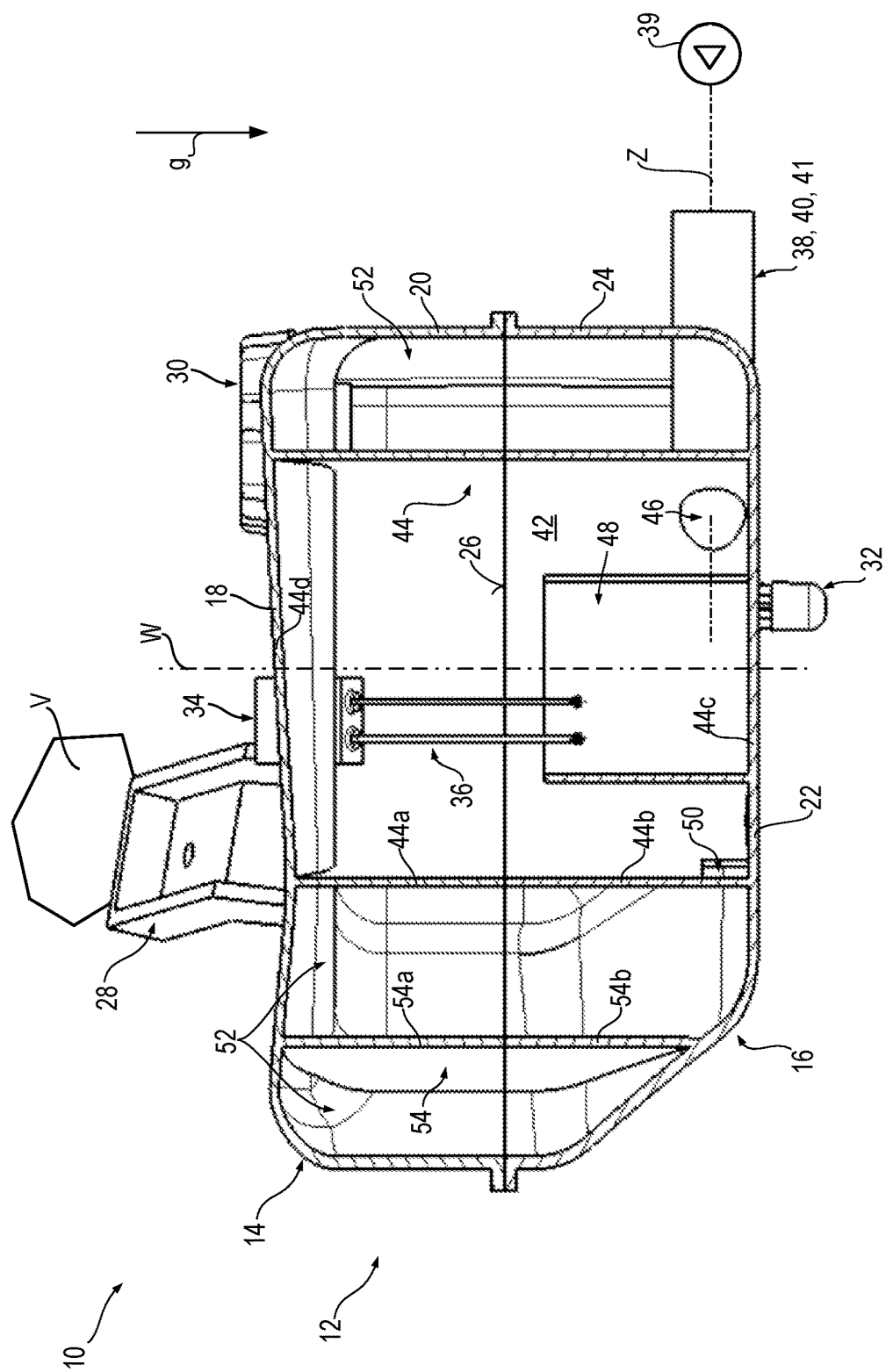
FIG. 1A sectional view through an equalizing reservoir according to the invention along a sectional axis parallel to the vortex chamber's axis, FIG. 2A top view of the inside of the lower reservoir shell of the equalizing reservoir of FIG. 1, and FIG. 3 A perspective view of the inner region of the lower reservoir shell of FIG. 2.

Referring now to the drawings wherein the showings are for the purpose of illustrating preferred and alternative embodiments of the invention only and not for the purpose of limiting the same, in FIG. 1, an embodiment form according to the invention of a coolant equalizing reservoir is denoted generally by 10. The equalizing reservoir 10 exhibits a reservoir housing 12 and is formed from an upper reservoir shell 14 and a lower reservoir shell 16.

The upper reservoir shell 14 comprises a reservoir top 18 and an upper side-wall 20 projecting integrally from the reservoir top 18, encircling in a closed manner, as sections of the reservoir housing 12.

The lower reservoir shell 16 comprises a reservoir bottom 22 which in the operational state of the equalizing reservoir 10 is opposite to the reservoir top 18 and a lower side-wall 24 projecting integrally from the reservoir bottom 22, encircling in a closed manner, as sections of the reservoir housing 12. The upper and the lower reservoir shell 14 and/or 16 respectively are bonded with one another, in particular welded, for example by mirror welding or by another suitable welding method, along a joint plane 26.

On the outside of the reservoir shells 14 and 16 there are molded functional formations, such as for example mountings 28, 30, and 32 for attaching the equalizing reservoir 10 to a structure surrounding it, in particular the structure of a vehicle V. A further functional formation is the sensor mounting 34 which in the depicted example penetrates through the upper reservoir shell 14, which holds a sensor arrangement 36 for detecting operational states of the equalizing reservoir 10 and/or properties of the coolant flowing through the equalizing reservoir 10.

In the region of the reservoir bottom 22, a tube 38 configured integrally with the lower reservoir shell 14 conducts at the lower reservoir shell 14 coolant into the equalizing reservoir 10 as part of a feed line 40. In the depicted example, the tube 38 and the feed line 40 proceed advantageously along a straight feed axis Z, conceived as penetrating centrally through the tube 38 and the feed line 40. The feed line 40 is part of a coolant circuit and/or cooling circuit respectively 41 in the motor vehicle V. This cooling circuit 41 comprises a pump 39, which during operation of the cooling circuit 41 produces volume flows of coolant of between 30 and 50 l/min.

Both reservoir shells 14 and 16 are produced in an injection molding process from a thermoplastic synthetic, preferably from polyethylene or polypropylene.

The equalizing reservoir 10 is depicted in FIG. 1 in its operational spatial orientation. The arrow g indicates the gravitational direction. This proceeds parallel to the drawing plane of FIG. 1 and orthogonally to the drawing plane of FIG. 2.

Inside the equalizing reservoir 10 there is configured a cylindrical vortex chamber 42 which extends continuously from the reservoir bottom 22 to the reservoir top 18. As an aid for easier description of the inner region of the equalizing reservoir 10, there is depicted a virtual vortex chamber's axis W which is conceived as penetrating centrally through the vortex chamber 42. Due to the cylindrical shape of the vortex chamber 42, the virtual vortex chamber's axis W coincides with the cylinder axis of the vortex chamber 42.

In the present case, the wall 44 of the vortex chamber 42 is configured in two parts with approximately equal parts in the upper reservoir shell 14 and in the lower reservoir shell 16. An upper vortex chamber wall 44a configured integrally with the upper reservoir shell 14 and a lower vortex chamber wall 44b configured integrally with the lower reservoir shell 16 meet in the joint plane 26 and are welded there with one another producing the wall 44 of the vortex chamber 42.

The feed line 40 penetrates through the lower side-wall 24 and discharges into the vortex chamber 42 at an outlet aperture 46. Coolant introduced into the vortex chamber 42 via the outlet aperture 46 eccentrically with respect to the vortex chamber's axis W flows into the vortex chamber 42 and after striking the inner surface of the wall 44 is deflected into a turbulent flow oriented anticlockwise when viewing FIG. 2.

The vortex chamber 42 extends with its lower vortex chamber wall 44b away from a base-wall section 44c towards an end-wall section 44d. The base-wall section 44c is formed by a section of the reservoir bottom 22, the end-wall section 44d by a section of the reservoir top 18.

Likewise along the vortex chamber's axis W there extends a flow baffle 48 away from the base-wall section 44c. Orthogonally to the vortex chamber's axis W there proceeds the flow baffle 48 at a distance from the lower vortex chamber wall 44b. The flow baffle 48, which is curved about an axis of curvature parallel to the vortex chamber's axis W, does not reach in the depicted example up to the joint plane 26, but ends at a distance from it. The flow baffle 48 extends, however, so far along the vortex chamber's axis W that its longitudinal end located distally from the reservoir bottom 22 is located nearer to the joint plane 26 than to the reservoir bottom 22.

Figure 2:
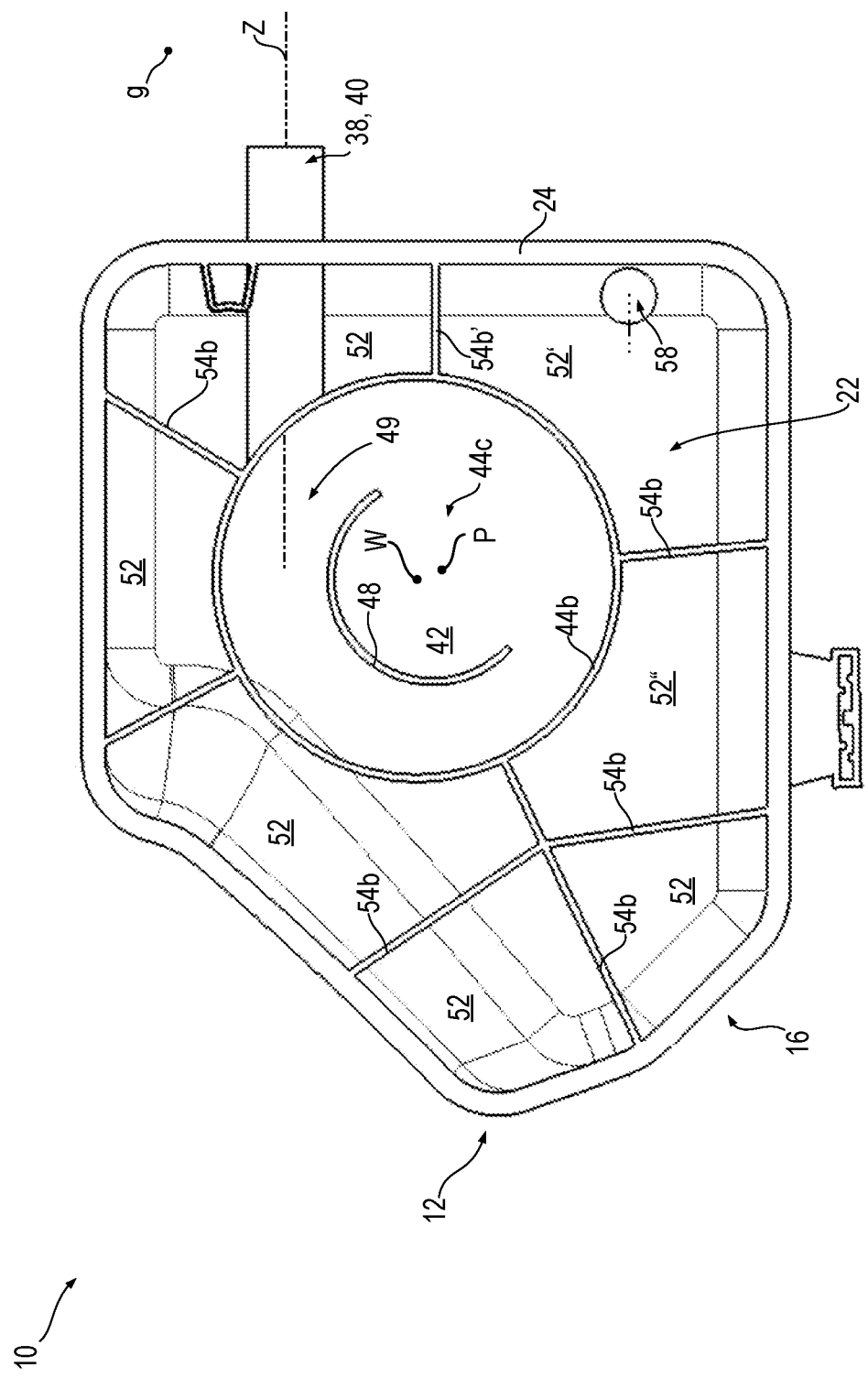

The flow baffle 48 is indeed curved about the vortex chamber's axis W, but extends only incompletely about the vortex chamber's axis W and does not encircle it in a closed manner. The encircling angle of the flow baffle 48 about an axis P central in respect of the flow baffle 48 (s. FIG. 2), which unlike in the depicted embodiment example can be the vortex chamber's axis W, is approximately 180°.

Figure 3:
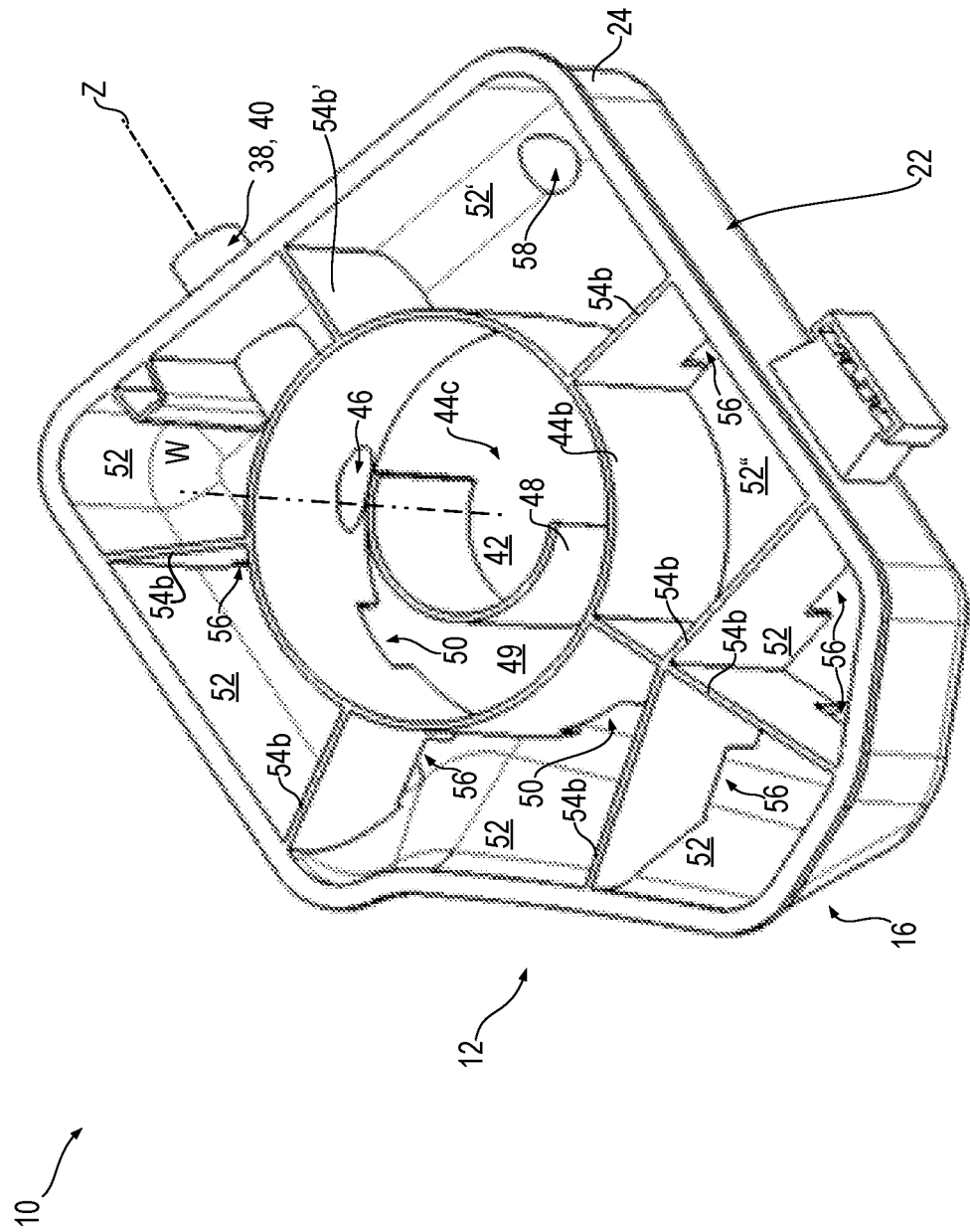

As can be discerned in FIGS. 2 and 3, in the depicted example the flow baffle 48 is configured approximately part-cylindrically, where the cylinder axis P (s. FIG. 2) of the flow baffle 48 proceeds at a distance from the vortex chamber's axis W, such that the distance between the flow baffle 48 and the lower vortex chamber wall 44b opposite to it decreases counterclockwise in FIG. 2 along the circumferential extension of the two formations. The outlet aperture 46 of the feed line 40 faces towards a region between the flow baffle 48 and the lower vortex chamber wall 44b in which the distance between these is greater. Consequently, a coolant introduced into the gap 49 between the flow baffle 48 and the lower vortex chamber wall 44b flows counterclockwise when viewing FIG. 2 along the gap 49 and is accelerated through the decreasing gap size of the gap 49 along the flow path.

Coolant can flow from the vortex chamber 42 via several passage apertures 50 into the outside environment of the vortex chamber 42 between the wall 44 of the vortex chamber 42 and the reservoir housing 12. Only one passage aperture 50 is discernible in FIG. 1. FIG. 3, however, shows two passage apertures 50.

Outside the vortex chamber 42 there are configured expansion chambers 52, of which each two immediately neighboring expansion chambers 52 are separated from one another by a planar partition 54. The partitions 54 too, extend completely between the reservoir bottom 22 and the reservoir top 18. Like the wall 44 of the vortex chamber 42, every partition 54 in the depicted embodiment example is also formed by an upper partition 54a and a lower partition 54b which contact one another in the joint plane 26 and are preferably connected, especially preferably firmly bonded, with one another.

Since the two reservoir shells 14 and 16 are preferably produced by injection molding, in the depicted example the upper and lower partitions 54a and/or 54b respectively are configured integrally with the reservoir housing 12, that is, with the reservoir top 18, reservoir bottom 22, and side-walls 20 and 24.

In each partition 54 except for the partition between the feed line 40 and the outflow aperture 58, whose lower partition 54b' can be seen in FIGS. 2 and 3, there is configured one communicating aperture 56 through which coolant can flow from one side of the partition 54 to the other side of the partition 54.

The vortex chamber 42 is configured in every direction orthogonal (radial) to the vortex chamber's axis W at a distance from the reservoir housing 12. A flow of coolant in the circumferential direction about the vortex chamber's axis W is possible through the communicating apertures 56.

The outflow aperture 58 through which coolant can exit from the equalizing reservoir 10, can be discerned in FIGS. 2 and 3. The outflow aperture 58 discharges directly from an expansion chamber 52', such that coolant imperatively has to flow from the vortex chamber 42 into the expansion chamber 52' with the outflow aperture 58 in order to be able to leave again the equalizing reservoir 10.

In order to increase the flow path and thereby the dwell time of the coolant in the equalizing reservoir 10, the vortex chamber 42 does not exhibit passage apertures 50 to the expansion chamber 52' with the outflow aperture 58 and to the expansion chamber 52" adjacent to this expansion chamber 52' against the vortex direction of the coolant in the vortex chamber 42. The vortex chamber 42 does, however, exhibit one passage aperture 50 each in the rest of the expansion chambers 52 bordering the vortex chamber 42.

The partition 54 between the outflow aperture 58 and the feed line 40 does not exhibit a communicating aperture 56. It extends completely over the entire cross-sectional area of the interior space between the vortex chamber 42 and the reservoir housing 12. All the rest of the partitions 54 exhibit a communicating aperture 56 each. Consequently, all the expansion chambers 52 communicate with one another, with the exception of the immediately neighboring expansion chambers 52 through which the feed line 40 proceeds and the expansion chamber 52' in which the outflow aperture 58 is located.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A coolant equalizing reservoir for arrangement in a coolant circuit, comprising:
a reservoir housing,
a vortex chamber in the reservoir housing,
a feed line for introducing coolant into the reservoir housing, and
an outflow aperture for discharging coolant from the reservoir housing,
where the feed line discharges into the vortex chamber, wherein the vortex chamber is defined by a wall protruding from a base-wall section of the reservoir housing along a vortex chamber's axis, encircling the vortex chamber's axis in a closed manner, which in every direction orthogonal to the vortex chamber's axis is arranged at a distance from the reservoir housing, wherein a flow baffle is arranged inside the vortex chamber, the flow baffle extending only along a circumferential section, but not completely closed about the vortex chamber's axis, where there is a gap having a gap spacing between an inner surface of the wall of the vortex chamber and a surface of the flow baffle facing towards the wall of the vortex chamber and along a flow path of the coolant in the gap, where the gap spacing in the flow path is constant along the vortex chamber's axis and becomes smaller and/or larger about the vortex chamber's axis to accelerate or decelerate the coolant in the vortex chamber.

2. The coolant equalizing reservoir according to claim 1, wherein the vortex chamber is accommodated in the reservoir housing with coolant able to flow completely around its outside in a circumferential direction.

3. The coolant equalizing reservoir according to claim 2, wherein the wall of the vortex chamber exhibits at least one passage aperture which penetrates completely through the wall in the thickness direction.

4. The coolant equalizing reservoir according to claim 3, wherein the wall of the vortex chamber exhibits a plurality of passage apertures which penetrate completely through the wall in the thickness direction, where at least two of the passage apertures are arranged at different circumferential positions in the circumferential direction about the vortex chamber's axis and/or are arranged at different positions in a direction along the vortex chamber's axis and/or exhibit different shapes and/or different aperture cross-sectional areas.

5. The coolant equalizing reservoir according to claim 1, wherein the flow baffle proceeds in parallel to an inner wall surface of the vortex chamber at a distance to it.

6. The coolant equalizing reservoir according to claim 1, wherein the vortex chamber extends from the base-wall section of the reservoir housing along the vortex chamber's axis up to an end-wall section of the reservoir housing opposite the base-wall section.

7. The coolant equalizing reservoir according to claim 1, wherein the region inside the reservoir housing but outside the vortex chamber is subdivided into a plurality of chambers communicating with one another.

8. The coolant equalizing reservoir according to claim 7, wherein partitions which separate two neighboring chambers from one another exhibit a communicating aperture through which coolant can flow from one of the chambers into the respective other one, where the communicating aperture of at least two of the partitions are arranged at different distances from the vortex chamber and/or are arranged at different positions in a direction along the vortex chamber's axis and/or exhibit different shapes and/or different aperture cross-sectional areas.

9. The coolant equalizing reservoir according to claim 8, wherein the partitions separating two neighboring chambers from one another extend from a reservoir bottom up to a reservoir top opposite the reservoir bottom.

10. The coolant equalizing reservoir according to claim 7, wherein partitions separating two neighboring chambers from one another extend from a reservoir bottom up to a reservoir top opposite the reservoir bottom.

11. The coolant equalizing reservoir according to claim 1, wherein the outflow aperture is configured outside the vortex chamber in the reservoir housing.

12. A Motor vehicle with a coolant circuit with an equalizing coolant reservoir according to claim 1, wherein the coolant circuit comprises a pump which is configured to achieve during proper normal operation a coolant flow of more than 12 l/min.

* * * * *